Oct. 25, 1955

W. H. ERIKSON ET AL

MOUNTING MEANS FOR MAGNETIC RECORDING AND/OR REPRODUCING HEAD 2,721,743

Filed March 14, 1950

4 Sheets-Sheet 1

*INVENTORS*
ERNEST ROSSBACHER
WALTER H. ERIKSON
*BY* T. L. Bowes
ATTORNEY

*INVENTORS*
ERNEST ROSSBACHER
*BY* WALTER H. ERIKSON
T. L. Bowes
ATTORNEY

Oct. 25, 1955

W. H. ERIKSON ET AL 2,721,743

MOUNTING MEANS FOR MAGNETIC RECORDING AND/OR REPRODUCING HEAD

Filed March 14, 1950

4 Sheets-Sheet 3

INVENTORS
ERNEST ROSSBACHER
WALTER H. ERIKSON
BY T. L. Bowes
ATTORNEY

INVENTORS
ERNEST ROSSBACHER
BY WALTER H. ERIKSON
T. L. Bowes
ATTORNEY

United States Patent Office 2,721,743
Patented Oct. 25, 1955

2,721,743

MOUNTING MEANS FOR MAGNETIC RECORDING AND/OR REPRODUCING HEAD

Walter H. Erikson and Ernest Rossbacher, Rochester, N. Y., assignors, by mesne assignments, to General Dynamics Corporation, a corporation of Delaware Application March 14, 1950, Serial No. 149,564

7 Claims. (Cl. 274—4)

Figure 1:
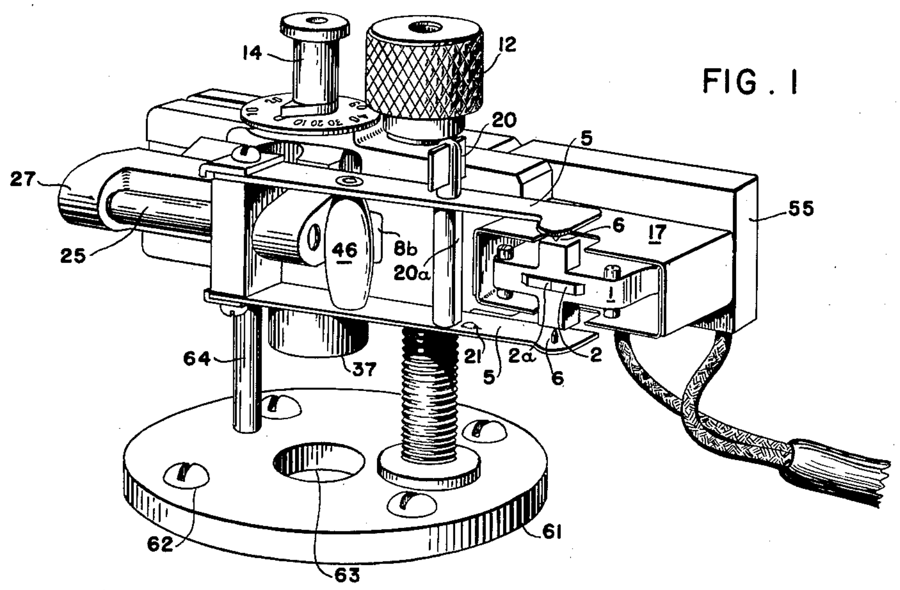

This invention relates to magnetic recording and more particularly to mounting means for magnetic heads for use in magnetic recording systems, whether used for recording or reproducing or both.

Many arrangements have been proposed in the past for mounting magnetic heads with respect to a magnetic medium upon which sounds are to be recorded or from which previously recorded sounds are to be reproduced. Such a medium may, for example, be a wire, a tape, a drum, or a disk provided with suitable magnetic material. A magnetic head commonly comprises a core having an air gap thereacross and windings which serve to develop a magnetic field across the gap or to translate the magnetic condition of a medium into an electric current representing sounds to be reproduced.

It has been our experience that the space between the surface of the recording medium and the surface of the core containing the air gap which is presented to the medium is a source of leakage flux and this space should be as small as possible in order to obtain maximum flux and also for best frequency response.

We have found that for best performance in a magnetic recording system, the magnetic head should engage the recording medium and such engagement or contact should be maintained as uniformly as possible at all times. This condition is difficult to achieve when the recording medium is a hard-surfaced cylinder or disk which may have eccentricity or surface irregularities.

It is an object of our invention to provide a new and improved mounting means for magnetic heads.

It is another object of our invention to provide a mount for a magnetic head in which the head is maintained in intimate engagement with the surface of the associated medium at all times.

It is another object of our invention to provide a new and improved head mounting for magnetic recording systems which permits of simple and rapid adjustment of the position of the head for optimum performance and which insures maintenance of optimum adjustment over long periods of time.

Still another object of our invention is to provide a new and improved pivotal support for a magnetic head which permits ready adjustment of the head transversely of the medium, which may be readily adjusted to maintain the face of the head in parallelism with the adjacent medium, and which permits the head to be readily removed from or inserted in operative position.

In accordance with our invention we have provided a mount for a magnetic recording head which provides a pivotal support for mounting the head in operative relationship closely adjacent the medium. Preferably the pivotal support is positioned as closely as possible to the air gap in the magnetic core of the head and the surface of the adjacent medium. In the preferred form of our invention the mounting means comprises a pair of spaced-apart leaf spring members having pivots engaging the upper and lower face of the head through bearing or pivot members. Means is provided for moving apart the spring members to release or disengage the head. Means is provided for biasing the mounting members and the head toward the medium so that the core surface containing the air gap will follow eccentricities or other deviations of the associated magnetic medium and, therefore, maintain the core surface in engagement with the medium at all times and under a substantially constant pressure. Means is also provided for adjusting the core surface for parallelism with the adjacent surface of the magnetic medium, and for moving the mounting means and the head transversely of the medium, as well as toward and away from the medium.

Means is provided in accordance with another phase of our invention to hold the head in position to be engaged by the pivot members while inserting or removing the head with respect to its mount. In the preferred embodiment of our invention this means comprises a substantially U-shaped clamping member. The ends of this member are maintained out of engagement with the head during periods of operation of the head, i. e., when the head is supported between the mounting members. Means is provided for causing the arms of the U-shaped member to move into engagement with suitable recesses or the like in opposite sides of the head. When so engaged the pivotal mounting members may be released from engagement with the head and its clamping means.

Figure 2:
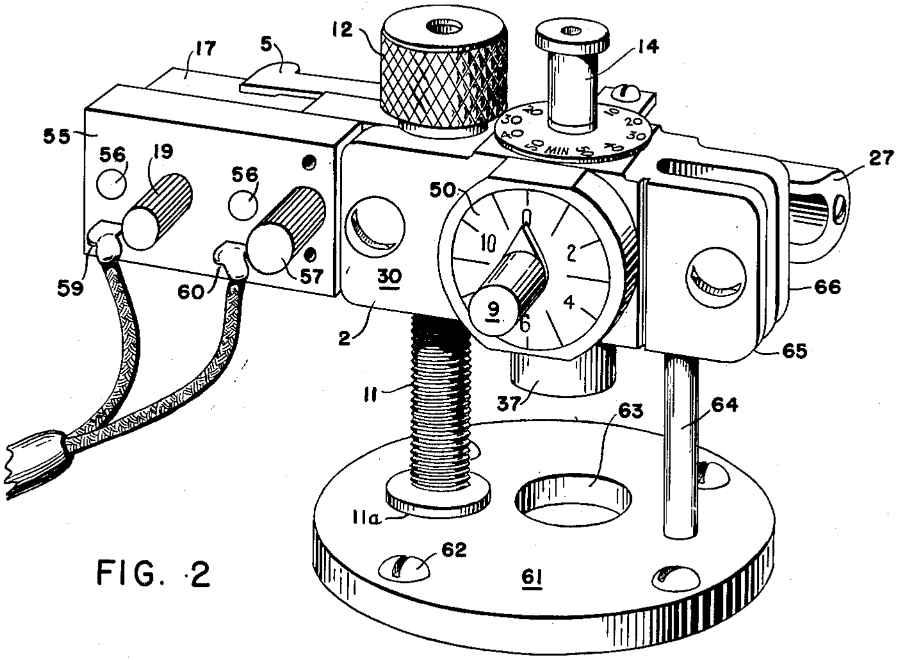
Figures 3, 4, 5:
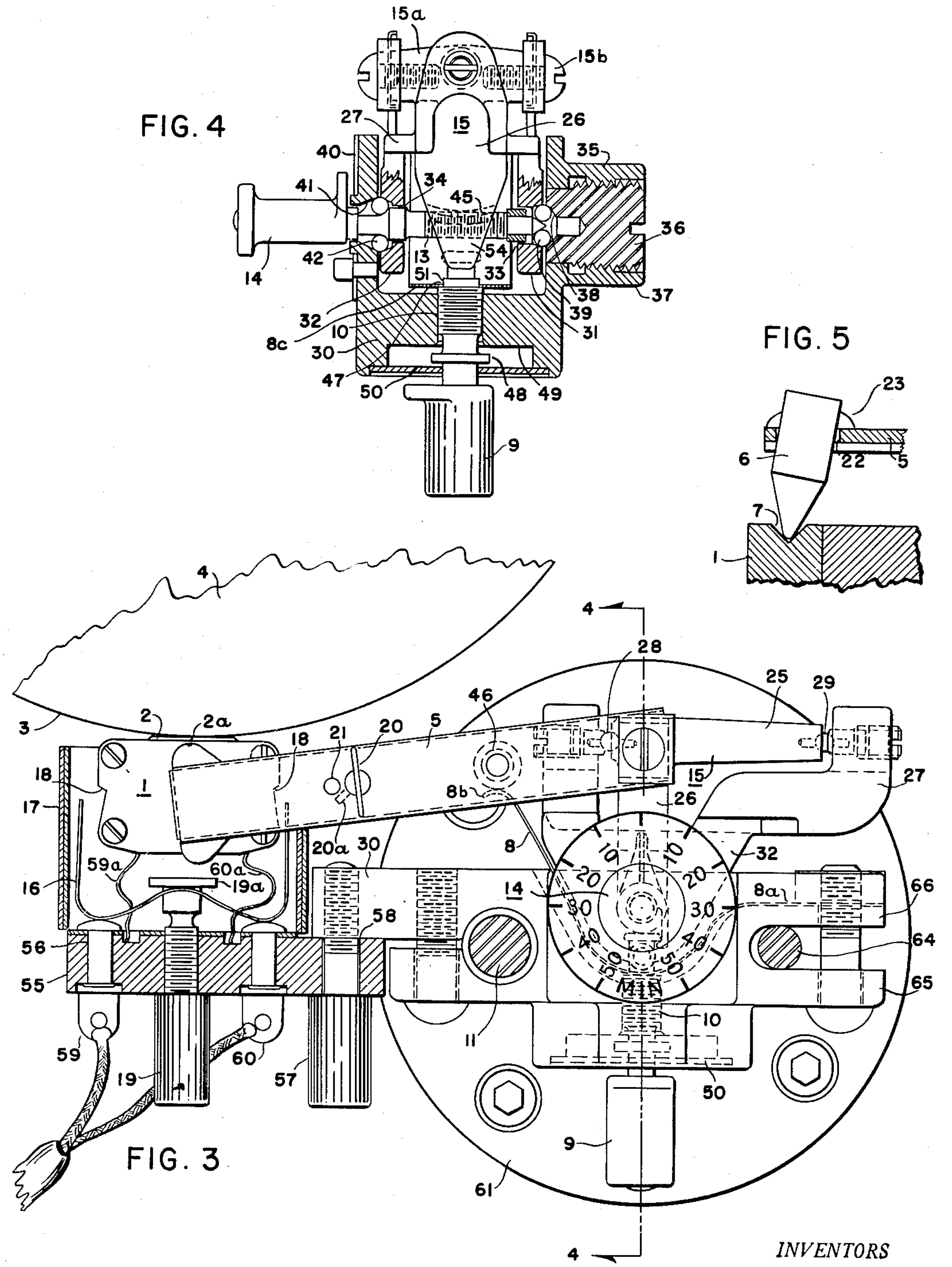
Figure 8:
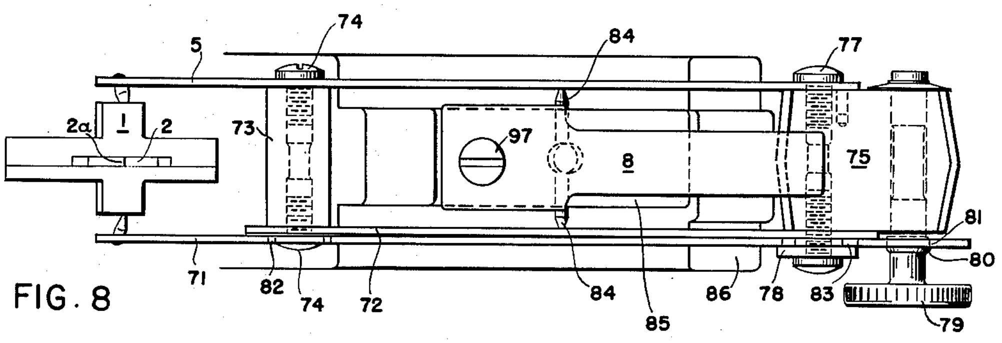
Figure 11:
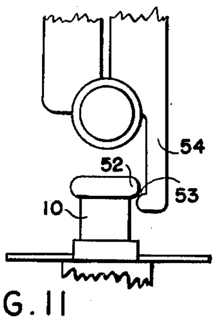
Figure 6:
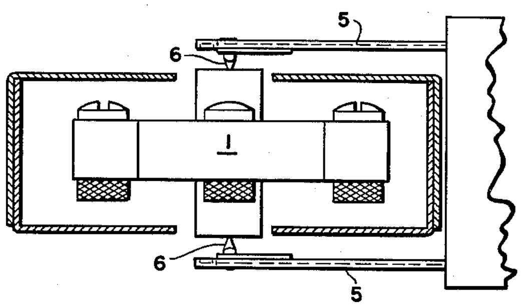
Figure 7:
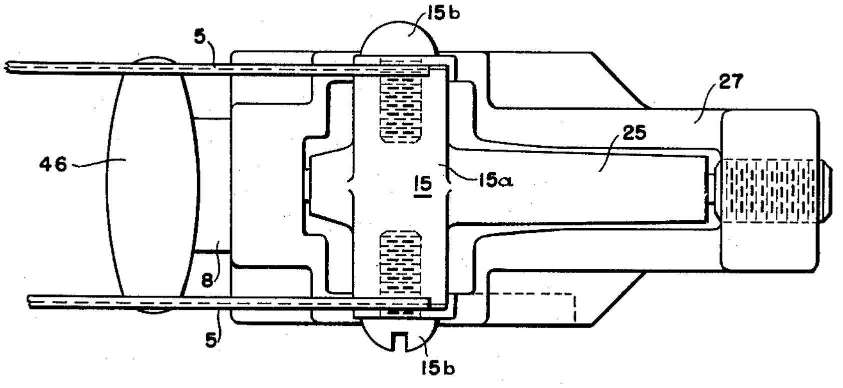
Figure 9:
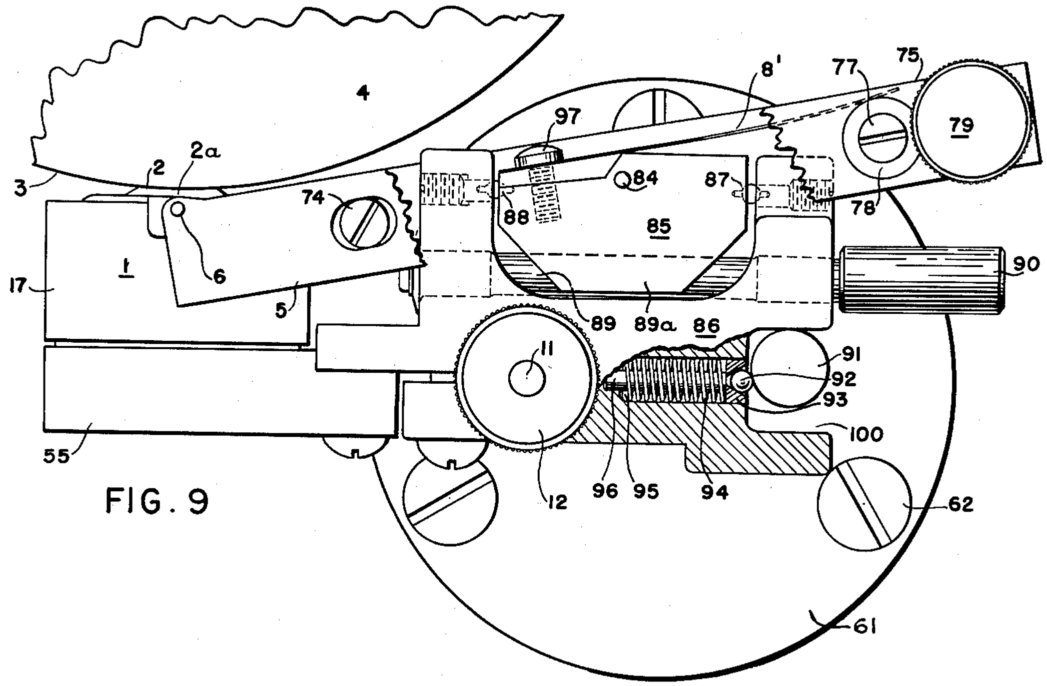
Figure 10:
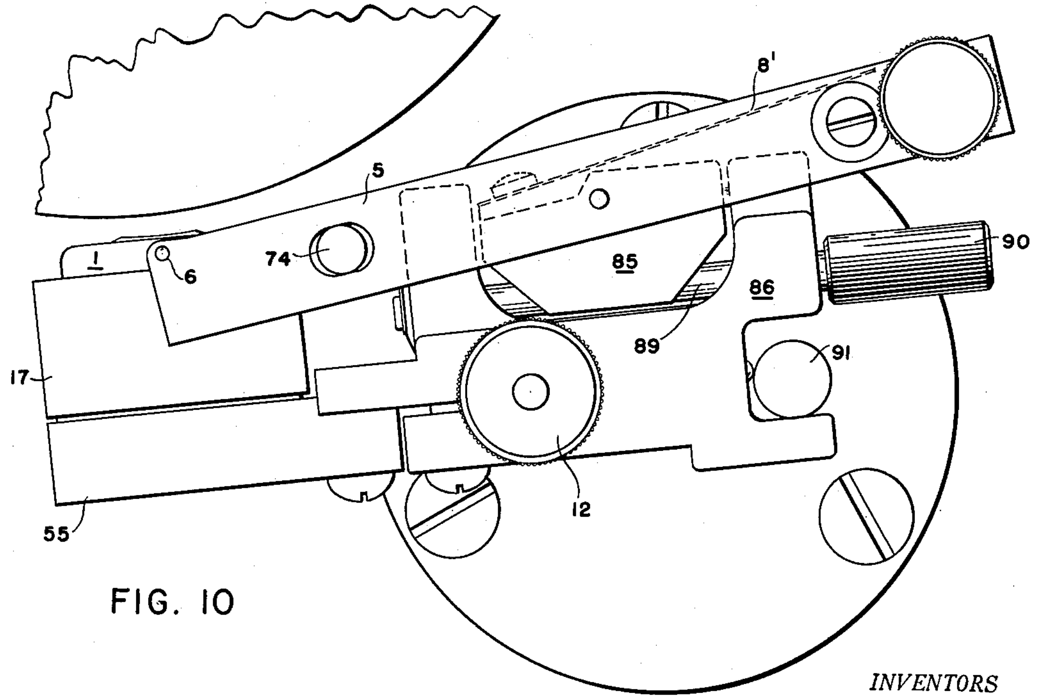

The features of our invention which we believe to be novel are set forth with particularity in the appended claims. Our invention itself, both as to its organization and manner of operation, together with further objects and advantages thereof, may best be understood by reference to the following description taken in connection with the accompanying drawing in which Figs. 1 and 2 are perspective views of opposite sides of a magnetic head mount embodying the principles of our invention; Fig. 3 is a plan view partly in section of the apparatus shown in Figs. 1 and 2; Fig. 4 is a view, partly in section, taken along the line of 4—4 of Fig. 3; Fig. 5 is an enlarged view of a piovtal bearing mount for the recording head shown herein; Figs. 6 and 7 are enlarged views of a portion of the apparatus shown in Figs. 1, 2 and 3; Figs. 8, 9 and 10 illustrate a second embodiment of our invention; and Fig. 11 is an enlarged view of a portion of the apparatus shown in Fig. 3.

In the drawings, there is illustrated a magnetic head 1 having a suitable core assembly 2 with a suitable air gap *2a* arranged to be mounted in operative relationship with respect to a suitable recording medium 3. The head 1 may be of any desired type and those skilled in the art will understand that such a head may comprise a laminated core structure 2 and one or more coils (not shown) wound or suitably arranged with respect to the core. The head 1 also comprises a suitable container or case. The magnetic medium 3 may be of any suitable type. For example, it may be a wire, a tape, a disk, or a drum. There is illustrated in the drawings a magnetic medium suitably carried on the outer circumference of a drum 4, although the medium 3 may, for example, be a wire, a tape or a perforated film wherein the medium passes around a rotating drum or over a curved platen at the point where the head contacts the medium.

Means is provided for pivotally mounting the head 1 with respect to the medium 3. In the form of our invention shown in Figs. 1 and 2, this means includes a pair of spaced-apart leaf springs 5, each of which has a pivot member 6 arranged to engage a suitable recess 7 in a face or side of the head 1.

In order to bias the mounting means and head in the direction of the magnetic medium, there is provided resilient means such as the bowed spring 8 disposed to bias the arms 5 and, hence, the head 1 toward the medium. Means is provided for adjusting the tension or amount of bias applied by spring 8 and, therefore, the pressure with which core 2 of head 1 bears against the medium 3. For this purpose, manual rotation of a suitable knob 9 causes a threaded shaft 10 to bear against the bowed spring 8 to vary the position of the spring.

In order to adjust the position of the head 1 transversely of the medium 3, there is provided a threaded member or screw 11 and a knob 12.

In order to adjust the position of the core face of head 1 relative to the surface of the adjacent medium 3 and to maintain these surfaces in parallel relationship, there is provided a worm drive comprising worm screw 13 which operates under the control of knob 14 and worm segment 15 to rotate the arms 5 and head 1 about an axis tangential to the curved surface of the medium at the point of engagement with the head 1.

Means is provided for holding the head 1 during assembly and disassembly of the head from the rest of the apparatus. This means comprises a spring member 16 suitably disposed within a shield 17 and positioned so that its ends engage in notches 18 when knob 19 is turned sufficiently.

In order to disengage the leaves or members 5 from head 1, there is provided a suitable key 20 having key portion 20*a* arranged to engage projection 21 on one of the leaves 5 to spread the leaf spring sufficiently to free pivots 6 from recesses 7.

Proper rotation of knob 9 not only removes the bias on spring 8 but causes withdrawal of the head 1 from the surface of the medium 3.

The foregoing describes briefly the component features of our invention. There follows a more detailed description of the apparatus disclosed in the drawings.

The head 1 is provided on opposite faces with countersunk recesses 7 which function as bearings for two jewel pivots 6 as best seen in Figs. 5 and 6. These pivots are fastened in openings 22 adjacent one end of the springs or members 5 in any suitable manner as by solder, for example, as indicated by numeral 23. It is desired that the axis or line between the pivot points be as close as possible to gap 2*a* in the head and, hence, to the surface of the medium 3. For this reason, the pivots 6 are not only directed toward each other to engage the recesses in head 1 but are also slanted or inclined in the direction of the medium 3. Moreover, the recesses 7 are provided adjacent the edges of head 1 nearest the medium 3.

The ends of springs 5 opposite the head 1 are suitably secured to the worm segment 15 as best seen in Fig. 7. Segment 15 is generally L-shaped, as best seen in Fig. 3, having a portion 25 which is approximately parallel to the leaves or arms 5 and lies along an axis tangential to the point of engagement of air gap 2*a* and medium 3 and a second portion 26 which is approximately normal to leaves or members 5. The members 5 may be suitably attached to the hub portion 15*a* of segment 15 by any suitable means as suitable threaded fastening members 15*b*, for example. The arm 25 is pivotally carried within yoke 27 by suitable ball bearing assemblies indicated generally by the numerals 28 and 29 at opposite ends of arm 25.

Yoke 27 is pivotally carried on a worm screw within a suitable housing 30. Yoke 27 is provided with depending arms 31 and 32 which have suitable openings 33 and 34, respectively, to receive screw 13. The lower arm 35 of housing 30 has an externally adjustable adjusting member 36 arranged to engage an internally threaded boss 37 on housing 30. Member 36 is recessed as indicated by the numeral 38 and cooperates with opening 33 to receive ball bearing assembly 39. The upper arm 40 of housing 30 has a recessed opening at 41 to receive worm screw 13 and to cooperate with recessed opening 34 to receive ball bearings 42. It is thus seen that worm screw 13 is journaled in ball bearing supports at either end of the threaded portion and the outer end carries knob 14. The inner end of arm 26 is bifurcated as shown in Fig. 11 and provided with worm segments 45 having engagement with the threads on the worm screw member 13 on either side thereof.

In order to adjust the head 1 for parallelism with respect to magnetic medium 3, knob 14 is rotated which causes arm 26 to rotate arm 25 about its axis and, therefore, rotate or rock the members 5 and the face of head 1 with respect to the surface of magnetic medium 3 about the axis of arm 25, which, as explained previously, is tangential to the surface of medium 3 at the point of engagement with air gap 2*a* in core 2.

As described, spring 8 is employed to bias head 1 toward the magnetic medium 3. Spring 8 is carried by housing 30. One end 8*a* of spring 8 is clamped in a suitable manner. One means of clamping is illustrated in Fig. 3. The other or free end 8*b* of spring 8 is arranged to bear against stud 46 which is suitably connected between arms 5 as by rivets, for example. Spring 8 is preferably bowed as indicated in Fig. 3. Screw 10 is provided with a shoulder 47 bearing against bowed part 8*c* of spring 8. Thus, as knob 9 is turned in a clockwise direction, for example, shoulder 47 bears more strongly against portion 8*c* of spring 8 and acts through the spring and stud 46 to urge the mounting members 5 and the head 1 toward the medium 3. Travel of screw member 10 is limited by the depth of recess 49, shoulder 48 being provided on the screw member 10 to engage the bottom of the recess at the desired limit of travel. In the other direction, travel of screw 10 is limited by engagement of shoulder 48 with the back of dial plate 50.

In order to disengage the head 1 from magnetic medium 3, knob 9 may be rotated in the counter-clockwise direction whereby shoulder 52 at the inner end of screw member 10 (see Figs. 3 and 11) engages the projection or cam portion 53 on arm 54 of member 26 which causes arm 54 to move toward the right as seen in the drawings and rotates yoke 27 about worm 13 as a center. As a result, members 5 and head 1 are moved away from medium 3. Rotation of knob 9 in the counterclockwise direction also releases the spring tension or bias by relieving the pressure of holding spring 8 against stud 46.

As is well known to those skilled in the art, it is usually desirable to provide a magnetic shield about the magnetic head. In the illustrated form of our invention, shield 17 is suitably fastened to a terminal plate 55 as by means of rivets 56, for example. The terminal plate may be suitably associated with the remaining portions of the apparatus. For example, terminal plate 55 may be fastened to housing 30 by means of a suitable screw 57 arranged to pass through a suitable opening 58 into an internally threaded bore in housing 30. External electrical connections may be made to terminals 59 and 60 which in turn are connected to leads 59*a* and 60*a* extending from head 1.

Spring 16 is generally U-shaped with the free ends arranged for engagement with head 1 in recesses 18. The clamping member 16 is preferably of spring material and the bottom portion of the U is preferably bowed as shown in the drawings. In order to move the arms of clamping member 16 into clamping engagement in recesses 18, there is provided a suitable adjusting means 19 having threaded engagement with mounting plate 55 and having a portion extending through a suitable opening in the clamping member or spring 16. The inner end of adjusting means 19 is provided with a shoulder 19*a*. With this arrangement counterclockwise operation of knob 19 causes shoulder 19*a* to bear downwardly on the bowed portion of clamping member 16 and the free ends are moved into engagement with recesses 18. In this position, arms 5 may be withdrawn from engagement with head 1 by operation of key 20 which, as best seen in Fig. 1, has a key portion 20*a* extending between the arms or springs 5 and which at one position of the key 20 will climb up on the inwardly directed cam projection 21 on the inner surface of the lower spring 5 to separate the members 5 sufficiently to permit the terminal plate 55 together with shield 17 and head 1 to be removed from the apparatus. Head 1 may then be disengaged from the shield 17 by clockwise rotation of member 19 until the spring 16 is disengaged from recesses 18. Similarly, when it is desired to place a head in operative position the head may be clamped in position by means of spring 16, and terminal plate 55 connected to housing 30; the arms 5 may then be operated to make pivotal engagement with head 1; and thereafter, the clamping member 16 may be disengaged and the recording apparatus is ready for operation.

The mounting apparatus shown herein may be supported in position in any suitable manner as, for example, by means of a suitable base 61 which may be suitably attached as by screws 62 to other remaining apparatus or to any suitable support. In order to permit the head 1 and its mount to be lowered to its maximum extent, there is provided in base 61 a suitable opening 63 to receive the boss 37 of housing 30. Vertical adjustment of the entire mount is achieved by means of screw 11 extending through a suitably threaded bore in housing 30. The lower end of screw 11 terminates in a suitable bearing surface or member **11*a* which may have a portion extending into a suitable recess (not shown) in plate or base 61. Thus, as knob 12 is rotated screw 11 turns upon base 61 and the housing 30 moves along screw 11 according to the rotation of knob 12. In order to retain the head mount in its relative position with respect to the base 61 as it is moved vertically by means of screw 11 and knob 12 there is provided a suitable guide pin 64 extending from base 61 between flanges 65 and 66 of housing 30**.

There is illustrated in Figs. 8, 9 and 10 a second embodiment of our invention. Head 1 is pivotally supported between spring members 5 and 71. A second longitudinally extending member 72 lies immediately adjacent to leaf member 71. Blades or members 5 and 72 are maintained in substantially parallel spaced-apart relationship by a suitable spacer 73 and threaded fastening members such as screws 74. The other ends of leaves 5 and 72 are maintained in position by tangential adjusting block 75 in conjunction with threaded fastening members 77. The foregoing arrangement permits longitudinal adjustment of member 71 with respect to members 72 and 5 and thereby permits adjustment of direction of the axis of the pivotal mounting of head 1. In order to provide the desired tangential or longitudinal adjustment, there is provided an adjusting member or knob 79 having eccentric portion 80 as indicated in Fig. 8 for engagement with suitable opening 81 in the member 71. To permit longitudinal movement of member 71 without conflict with the spacer 73 or block 75 there are provided suitable openings or slots 82 and 83 in member 71. The former receives one of the threaded members 74. The latter receives a spacing washer 78.

In this form of our invention, the members 5 and 71 are manually spread apart to release head 1 or to permit head 1 to be inserted in place.

Means is provided for adjusting the parallelism of head 1 with respect to medium 3. As best seen in Fig. 8 blades 5 and 72 have countersunk recesses or holes which act as bearings for jewel pivots 84 which are carried by the radial adjusting block 85 which in turn is pivotally carried by the vertical adjusting assembly 86 on a line tangential to the surface of medium 3 at air gap **2*a* by means of suitable ball assemblies as indicated by the numerals 87 and 88. A suitable eccentric stud 89 supported rotatably within a suitable slot 89*a* in block 85 and terminating in a suitable knob 90 permits rocking of block 85 about an axis through ball assemblies 87 and 88 which results in rotation of arms 5 and 71 and block 85** in a similar manner to permit adjustment of parallelism.

In order to provide vertical adjustment, knob 12 and screw 11 operate in the same manner as in the first-described embodiment.

In this embodiment of our invention, there is provided an in-engagement or "on" position, and an out-of-engagement or "off" position of the head 1. In order to maintain or hold assembly 86 in one or the other of these positions there is provided a guide pin 91 and a ball 92 carried by a suitable ball retainer 93 which is biased outwardly by a suitable helical spring 94 carried in a suitable slot or recess 95. If desired, a guide pin 96 may be provided for spring 94. The assembly 86 and pin 91 are arranged so that ball 92 tends to be maintained in one of two positions as delineated by the opposite ends of recess 100 provided in assembly 86. The "on" or contact position is shown in Fig. 9. The "off" or out-of-contact position is shown in Fig. 10. The mount is moved from one to the other position manually.

In order to provide the desired head pressure against medium 3 there is provided a leaf spring 8′ suitably connected to assembly 85 at one end of the spring as by suitable threaded fastening means 97. The other end of spring 8′ bears against block 75 and thereby tends to pivot arms 5 and 71 about the pivot points 84.

Referring to Fig. 10, the face of core assembly 2 is shown concave to match the corresponding curvature of the magnetic medium adjacent assembly 2. This detail assures intimate engagement of the head and the medium over a substantial area and further insures accurate positioning at all times of gap **2*a*** and the adjacent core surface with respect to the medium.

While we have shown and described a particular embodiment of our invention, it will be obvious to those skilled in the art that changes and modifications may be made without departing from our invention in its broader aspects. We, therefore, aim in the appended claims to cover all such changes and modifications as fall within the true spirit and scope of our invention.

What is claimed is:

1. In a magnetic recording system including a magnetic medium and a magnetic head for use in recording sound upon medium or reproducing sound previously recorded thereon, said head having an air gap across a surface thereof thereby constituting a pole face, the combination therewith of means for mounting said head in operative relationship with respect to said medium, said means comprising a pair of spaced apart members, each of said members having a portion lying substantially in line with the pole face portion of said head, and a pivot carried by each member adjacent an end thereof, said pivots being directed toward each other and inclined toward said pole face and terminating substantially in line with said air gap, said head having a pair of pivot receiving portions adjacent the air gap and located as close as possible to said pole face whereby said head is pivotally supported substantially at the surface of said medium as well as substantially in line with said air gap.

2. The combination set forth in claim 1 together with means for causing at least a portion of said medium to move on a curved path, means for biasing said members in a direction such that said head is maintained in engagement with said medium, and means for rotating said members and said head about a line substantially tangential to said curved portion of said medium to adjust the parallelism of the face of said head presented to said medium with respect thereto.

3. The combination set forth in claim 1 together with means for causing at least a portion of said medium to move on a curved path, means for biasing said members in a direction such that said head is maintained in engagement with said medium, means for moving said members and said head transversely of said medium, and means for rotating said members and said head about a line substantially tangential to said curved portion of said medium for adjusting the parallelism of the face of said head presented to said medium with respect thereto.

4. The combination of claim 1 together with means for moving one of said members with respect to the other of said members for adjusting the axis of said pivots.

5. In a magnetic recording system including a magnetic medium and a magnetic head for use in recording sound upon said medium or reproducing sound previously recorded thereon, the combination therewith of means for mounting said head in operative relationship with respect to said medium, said means including a pair of spaced apart members, means for pivotally mounting said head between said members, means carried by and secured to said members for separating said members to release said head from engagement therewith, means carried by the last mentioned mounting means for holding said head in position during assembly and disassembly and when said members are so separated comprising a U-shaped clamping member normally disengaged from said head, and means for causing the arms of said clamping member to engage opposite sides of said head.

6. In a magnetic recording system including a magnetic medium and a magnetic head for use in recording sound upon said medium or reproducing sound previously recorded thereon, the combination therewith of means for mounting said head in operative relationship with respect to said medium, said means including a pair of spaced apart members, means for pivotally mounting said head between said members, means carried by and secured to said members for separating said members to release said head from engagement therewith, means carried by the last mentioned mounting means for holding said head in position during assembly and disassembly and when said members are so separated comprising a U-shaped clamping member normally disengaged from said head, said head having a pair of recesses, the ends of said clamping member being arranged for engagement with said recesses, and means for moving said ends into holding engagement with said head.

7. In a magnetic recording system including a magnetic medium and a magnetic head for use in recording sound upon said medium or reproducing sound previously recorded thereon, the combination therewith of means for mounting said head in operative relationship with respect to said medium, said means including a pair of spaced apart members, means for pivotally mounting said head between said members, means carried by and secured to said members for separating said members to release said head from engagement therewith, means carried by the last mentioned mounting means for holding said head in position during assembly and disassembly and when said members are so separated comprising a U-shaped clamping member normally disengaged from said head, said head having a pair of recesses, the ends of said clamping member being arranged for engagement with said recesses, and means for moving said ends into holding engagement with said head and for maintaining said ends in engagement with said head.

References Cited in the file of this patent

UNITED STATES PATENTS

| | | |
|---|---|---|
| 995,680 | Jungren | June 20, 1911 |
| 1,444,477 | Miller | Feb. 6, 1923 |
| 1,727,136 | Seufert | Sept. 3, 1929 |
| 1,891,369 | Curtis | Dec. 20, 1932 |
| 2,003,434 | Goldhammer | June 4, 1935 |
| 2,067,347 | Rysick | Jan. 12, 1937 |
| 2,354,558 | Thompson | July 25, 1944 |
| 2,530,029 | Pond | Nov. 14, 1950 |
| 2,530,584 | Pontius | Nov. 21, 1950 |
| 2,535,480 | Begun | Dec. 26, 1950 |
| 2,560,569 | Hare | July 17, 1951 |
| 2,567,092 | Williams | Sept. 4, 1951 |